United States Patent [19]
McDaniel

[11] Patent Number: 5,226,388
[45] Date of Patent: Jul. 13, 1993

[54] AUTOMATED CAT LITTER DISPOSAL SYSTEM

[76] Inventor: Brian McDaniel, 4 Calle Espolon, Rancho Santa Margarita, Calif. 92688

[21] Appl. No.: 911,708

[22] Filed: Jul. 10, 1992

[51] Int. Cl.⁵ .............................................. A01K 1/035
[52] U.S. Cl. .................................................... 119/166
[58] Field of Search .................. 119/161, 163, 166, 28, 119/22

[56] References Cited

U.S. PATENT DOCUMENTS

| | | | |
|---|---|---|---|
| 2,843,086 | 7/1958 | Graham | 119/28 X |
| 4,096,827 | 6/1978 | Cotter | 119/166 |
| 4,120,264 | 10/1978 | Carter | 119/166 |
| 4,190,525 | 2/1980 | Menzel | 119/166 X |
| 4,357,904 | 11/1982 | Kuhlmann | 119/22 |
| 4,574,735 | 3/1986 | Hohenstein | 119/166 X |
| 4,706,607 | 11/1987 | Ijichi et al. | 119/22 X |
| 4,729,342 | 3/1988 | Loctin | 119/163 |
| 4,846,104 | 7/1989 | Pierson, Jr. | 119/166 |
| 4,854,267 | 8/1989 | Morrow | 119/166 X |
| 4,862,830 | 11/1989 | Coppola | 119/165 |
| 4,886,014 | 12/1989 | Sheriff | 119/166 |
| 4,897,183 | 1/1990 | Lewis, Jr. et al. | 119/161 X |

*Primary Examiner*—Robert P. Swiatek
*Attorney, Agent, or Firm*—Charles H. Thomas

[57] ABSTRACT

An automated cat litter disposal system for a cat litter box having a floor, upstanding side walls and end walls. A set of parallel tracks extend along the side walls. The tracks include lower sections extending from one end wall, upright sections rising from the lower sections proximate to the other end wall, and upper sections extending between the upright sections and the second end wall. A rigid scoop extends across the width of the cat litter box and is mounted by track followers to move along the track. The scoop has a lever mechanism which bears against the scoop guide that follows the course of the tracks. An electric motor drives the scoop along the tracks with the scoop lever bearing against the scoop guide. The scoop is thereby held in an orientation to scrape the floor of the cat litter box to lift scrapings from the floor as it moves through the transition between the lower track section and the upright section, and dumps the floor scrapings over the second end wall at the end of the upper track section.

13 Claims, 4 Drawing Sheets

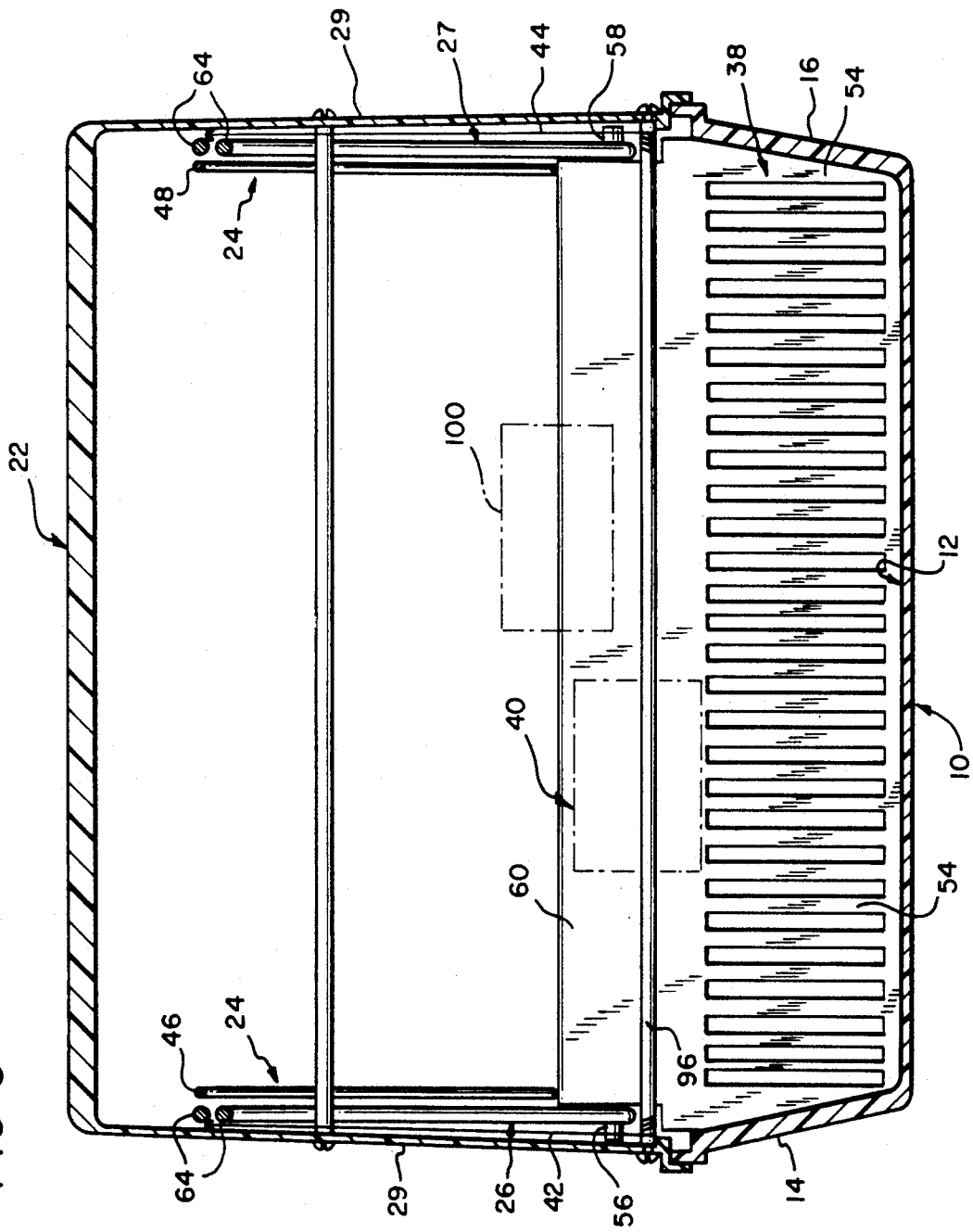

AUTOMATED CAT LITTER DISPOSAL SYSTEM

BACKGROUND OF THE INVENTION

1. Field of the Invention

The present invention relates to an improved, automated disposal system for cleaning cat litter boxes.

2. Description of the Prior Art

In the past, various systems have been devised for cleaning cat litter boxes. Once such system is described in U.S. Pat. No. 4,862,830, which discloses an arrangement for cleaning soiled cat litter from a rectilinear cat litter box. This system employs a brush that moves the length of the cat litter box along two rails. However, the litter box must be configured with one end open down to the litter box floor so that the cat litter material can be discharged, since the brush is movable only along a linear path. Furthermore, this system is totally manual in operation.

U.S. Pat. No. 4,190,525 discloses a crank operated sifting screen mechanism for a cat litter box. A screen member fits into slots in the sides of the litter box. The litter box also requires a special configuration including inclined end walls. The litter box is alternatively raised at its right and left ends to rest on the flat, inclined end walls as the litter material passes back and forth through the screen to collect fecal matter. In an alternative arrangement a sifting screen tray is positioned at the bottom member of the cat litter box and is simply lifted by handles from the litter bed. Refuse is retained in the tray and litter passes through it to remain in the bed. Neither system is in any way automated. U.S. Pat. No. 4,854,267 discloses another cat litter box having a special configuration in which a litter sifting arrangement is operated manually.

U.S. Pat. No. 4,574,735 is directed to an electronically operated cat litter disposal system which employs a rotatable rake that is driven by a motor for sifting through litter. However, the cat litter box must be of a generally cylindrical configuration and specially constructed with a discharge groove. Other systems which employ rotatable sifting systems usable only for specially configured cat litter boxes are disclosed in U.S. Pat. Nos. 4,846,104 and 4,120,264. Heretofore, however, automated cat litter disposal systems have not been available for use with cat litter boxes of the type which are most widely used.

The cat litter boxes which are currently the most commercially successful are configured with walls forming a rectangular prism, or in a shape in which the walls are only very slightly sloped, thereby forming a trapezoidal prism. These conventional commercially available cat litter boxes have upright side walls and upright end walls so as to adequately confine cat litter material to a region directly above the floor of the cat litter box. The level of the litter material is substantially below the upper rim of the walls and below the walls of any opening to the cat litter box. This prevents the litter material from being scattered outside of the box.

Cats can be readily trained to utilize a cat litter box having a conventional construction of the type described for purposes of discharging excrement. A cat kept as a house pet will habitually enter such a cat litter box, defecate, and then cover the excrement produced with the litter material. Disposable cat litter material is commercially available which is scented to mask the unpleasant odors of the bodily wastes which are discharged. The portion of the cat litter material which is soiled will often tend to clump together when fecal matter is discharged on it.

Although cat litter material is usually scented to mask unpleasant odors, it can only be used for a limited period of time before the odors in the vicinity of the cat litter box become offensive. It is thereupon necessary for the owner of the pet to clean the litter box. The process of manually cleaning a cat litter box exposes the individual undertaking the task to very considerable odors which are released as the cat litter material is sifted from the cat litter box. The cleaning of a conventional cat litter box is therefore widely regarded as a very unpleasant task.

SUMMARY OF THE INVENTION

It is an object of the present invention to provide an improved automated system for disposing of soiled cat litter from conventional cat litter boxes having the most widely used configurations. Specifically, the system of the present invention provides a means for automatically cleaning cat litter boxes which are formed as trays having upright walls and which are shaped generally as a rectangular prism or as an inverted trapezoidal prism. The system of the present invention is adapted for use with commercially available cat litter boxes of this type, and is not limited to use with specially designed cat litter boxes.

A very important object of the invention is to provide a system for cleaning a cat litter box which can be performed automatically and without the necessity for manual sifting or scraping of the litter box. Indeed, a very important feature of the invention is that once the system is put into operation, the pet owner need not remain in the immediate vicinity of the cat litter box during the time that it is being cleaned. To the contrary, once the system is set in operation, the user can depart from the immediate area of the cat litter box, and is not subjected to the offensive odors which are released during the cleaning process.

Cleaning of the cat litter box is performed automatically and the soiled litter material is automatically carried from the litter box and is dumped into a discharge receptacle provided to receive the soiled litter material. Following the completion of operation of the automated system, the operator need merely return to the area of the cat litter box and dispose of the discharge receptacle containing the soiled litter material, such as by placing the discharge receptacle in the trash.

In one broad aspect the present invention may be considered to be an automated cat litter disposal system for a cat litter box having a floor, a pair of side walls and a pair of opposite end walls. The system is comprised of a set of parallel tracks that extend along the side walls. These tracks include lower sections that extend longitudinally along the side walls from one of the end walls, upright tracks sections rising from the lower track sections in proximity to the other of the end walls, and upper track sections extending between the upright track sections and the other end wall. The system also employs a rigid scoop that extends laterally between the tracks and is mounted for longitudinal movement therealong. A scoop propulsion means is provided for driving the scoop along the tracks between the opposite end walls of the litter box.

The automatic disposal system is provided with a scoop guide means for holding the scoop in an orientation to scrape the litter box floor as the scoop moves between the first end wall and the upright sections of the tracks. The scoop guide means also holds the scoop in an orientation to lift scrapings upwardly from the floor as the scoop moves along the upright sections of the tracks. Finally, the scoop guide means holds the scoop in an orientation to discharge the scrapings over the end wall proximate to the upright tracks sections as it reaches that end wall. A discharge receptacle, such as a trash bag, is located outside of the litter box at the end wall at which the scrapings are discharged to receive the scrapings from the scoop.

The scoop of the invention is comprised of a pair of coaxially aligned track followers which engage the tracks, a grate which depends from the track follower and which extends the width of the litter box between the side walls, and a lever means, that may take the form of a flange that extends outwardly away from the track followers in a direction opposite the grate.

The means for guiding the scoop may be comprised of a drag guide means in the form of a pair of rods which are formed as rails and which extend along the side walls to generally follow the course of the tracks. The scoop guide rails vary in spacing from the tracks so as to control the orientation of the scoop. The separation between the rods and the tracks is everywhere less than the distance which the lever flange extends radially outwardly from the axis of the track followers. As a result, the scoop guide rods will engage the lever flange as the propulsion means moves the scoop along the track in such a way that the lever flange always bears against the scoop guide rods in opposition to the resistance presented by the litter material in the litter box acting against the scoop grate.

As the propulsion means advances the scoop along the lower track sections, the grate is held at an inclination relative to the floor such that the edge of the grate traveling along the floor in contact therewith is the leading grate edge, and the remainder of the grate slopes upwardly and to the rear toward the track followers. As the scoop arrives at the transition between the lower track sections and the upright track sections, the scoop guide rods are configured to make a dip to closely approach the tracks. As the lever flange encounters this dip, it causes the scoop to rotate about the track followers to rotate the grate upwardly to a generally horizontal disposition. The grate is held in this disposition as the scoop is driven upwardly along the upright sections of the track. Furthermore, the separation between the scoop guide rods and the tracks is such that the grate of the scoop is still maintained in a generally horizontal disposition as the scoop makes the transition between the upstanding sections of the track and the upper track sections At the transition between the upright track sections and the upper track sections the scoop continues in its movement toward the end wall, opposite that from which it started its movement, still in a generally horizontal disposition. However, as the scoop approaches the opposite end wall, the scoop guide rods are curved outwardly away from the scoop tracks so that the separation between the scoop guide rods and the tracks increases substantially at the opposite end wall. This allows the weight of the scrapings from the floor of the litter box and the weight of the grate itself to move the scoop in counter-rotation to the extent permitted by the separation between the scoop guide rods and the tracks. The grate thereby rotates downwardly, thus discharging the scrapings carried from the floor of the litter box into a receptacle positioned immediately outside of the litter box at the opposite end wall where the scrapings are discharged. The extent of separation between the scoop guide rods and the tracks thereby controls the orientation of the scoop throughout the longitudinal movement of the scoop along the tracks.

The means for propelling the scoop is preferably comprised of a pair of wire rope cables on opposite sides of the disposal system. The cables are each configured into an endless loop. The endless loops are mounted on opposite sides of the cat litter box to follow the course of the track sections. Connectors couple the track followers to the cable loops so that advancement of the cables causes the scoop to move along the tracks. The cables may be driven to advance the loops alternatively in opposite directions. The cables are advanced in one direction to carry the scoop from one end of the litter box along the lower rail sections, up the upright sections and toward the opposite end wall of the litter box.

Once the scrapings from the floor of the litter box have been discharged by the scoop over the top of the opposite end wall, the direction of advancement of the endless loops is reversed. The scoop is thereby carried back along the tracks, down into the litter box, and is returned to its initial position proximate to the first end wall. The propulsion means of the automated cat litter disposal system of the invention preferably includes a reversible electric motor to drive and selectively control the direction of advancement of the cable loops.

The invention may also be considered to be an improvement in a cat litter box having a floor, upstanding side walls and a pair of mutually opposing end walls. The improvement of the invention resides in the provision of an automated cat litter disposal system in the litter box.

The litter disposal system includes stationary sets of parallel tracks arranged with lower sections extending longitudinally at a lower level along the side walls from a first of the end walls, upright sections located proximate to a second of the end walls and rising from the lower sections, and upper sections extending from the upright sections to the second end wall. A scoop is mounted to move along the tracks and extends between the side walls. The scoop has a length that extends between the lower sections of the tracks to the floor of the litter box. The scoop has a forwardly facing scooping surface.

The system also employs an automated scoop propulsion means for automatically driving the scoop along the tracks from a position proximate the first end wall to the second end wall. A scoop orientation guide means is arranged to hold the scoop directed downwardly into contact with the floor from the lower sections of the tracks, forwardly from the upright sections toward the second end wall, and downwardly as the scoop reaches the second end wall. A soiled litter collection container is located at the second end wall to receive soiled litter discharged from the scooping surface of the scoop.

Operation of the electric motor which drives the cables may be under control of either a timer circuit or a position sensing circuit and mechanism. That is, the reversible electric motor may be driven at a predetermined speed for a predetermined time to ensure that the scoop is carried from its starting position adjacent the first end wall to its final position above the second end wall at which the scoop discharges soiled litter material into the trash receptacle. Alternatively, the system may be operated under the control of limit switches which are tripped by the arrival of the scoop at its extreme positions. In still another arrangement the motor shaft may be provided with an optical encoder and programmed so as to cause the motor shaft to rotate a prescribed number of times to advance the scoop from its initial position to its final position, and to complete the same number of rotations in the opposite direction to return the scoop to its initial starting position.

The system may be set to operate through a single cycle, or to operate through a predetermined number of cycles before coming to rest. For example, the system may be preset to complete two complete cycles. In such an arrangement the scoop will start from its initial position adjacent the first end wall, advance along the lower track sections and up the upright track sections, temporarily halt at a scoop discharge position above the opposite end wall, and then return in the opposite direction traveling back along the upper track sections, down the upright track sections, and back along the lower track sections to return to its initial position adjacent the first end wall. The system may be programmed, through appropriate electrical circuitry, to immediately commence another cycle of movement to advance from the initial position adjacent the first end wall to the discharge position above the second end wall, and then return to its initial position. The number of cycles of operation which may be required for each cleaning operation will vary with the frequency of cleaning of the litter box and the consistency of litter material employed.

The invention may be described with greater clarity and particularity with reference to the accompanying drawings.

DESCRIPTION OF THE DRAWINGS

FIG. 3 is a sectional elevational view taken along the lines 3—3 of FIG. 2.

DESCRIPTION OF THE EMBODIMENT

Figure 1:
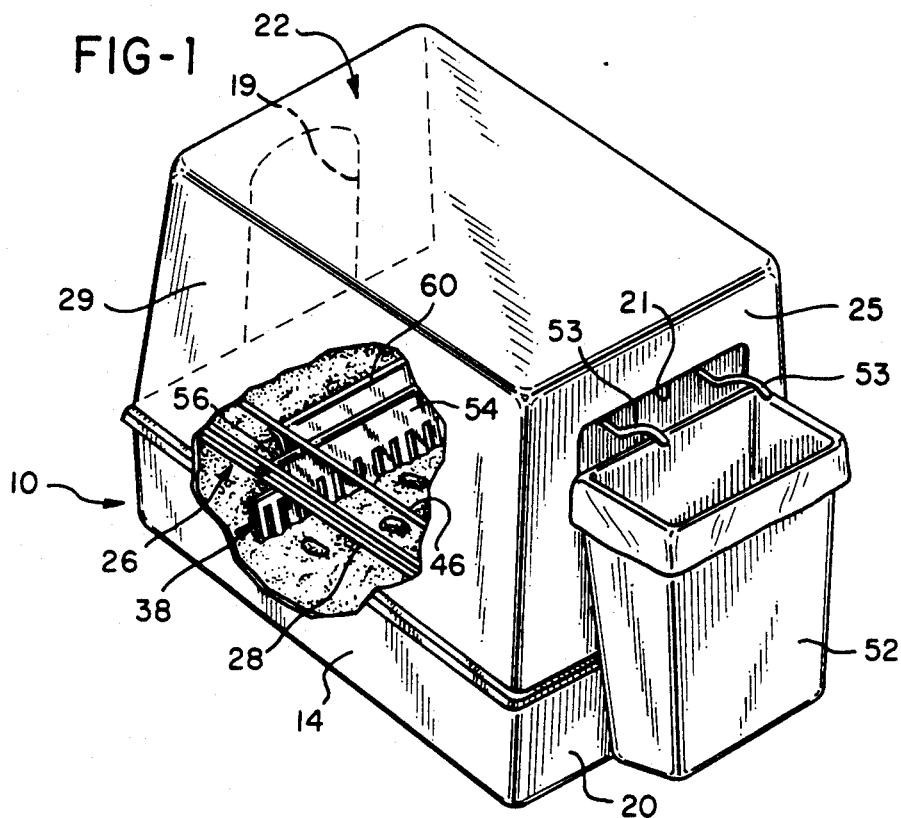
FIG. 1 is a perspective view illustrating a cat litter box employing the automated cat litter box cleaning system of the invention.

FIG. 1 illustrates a cat litter box indicated generally at 10 having a floor 12, visible in FIG. 3, upstanding side walls 14 and 16, and mutually opposing end walls 18 and 20. The shape of the cat litter box 10 is that of an inverted trapezoidal prism and is about four and one-half inches in interior depth. The cat litter box 10 is of the type which is totally enclosed and which is provided with a removable plastic hood 22. The walls of the hood have a downward and outward slope of one quarter of an inch for each six inches. Front and rear end openings 19 and 21, respectively are defined in the end walls 23 and 25 of the hood 22. An automated cat litter cleaning and disposal system indicated generally at 24 is mounted within the hood 22 in such a way as to automatically clean the cat litter box 10.

The automated cat litter box cleaning system 24 is comprised of a set of rigid, stainless steel tracks 26 and 27 which are mounted on the insides of the side walls 29 of the hood 22 parallel to each other and above the litter box side walls 14 and 16 respectively along the lengths thereof. The tracks 26 and 27 each include a lower longitudinally extending section 28, an intermediate generally vertical upright section 30, and an upper longitudinally extending section 32. Each of the tracks 26 and 27 is formed of a pair of parallel upper and lower stainless steel rods 64 which are everywhere equidistant from each other.

Figure 2:
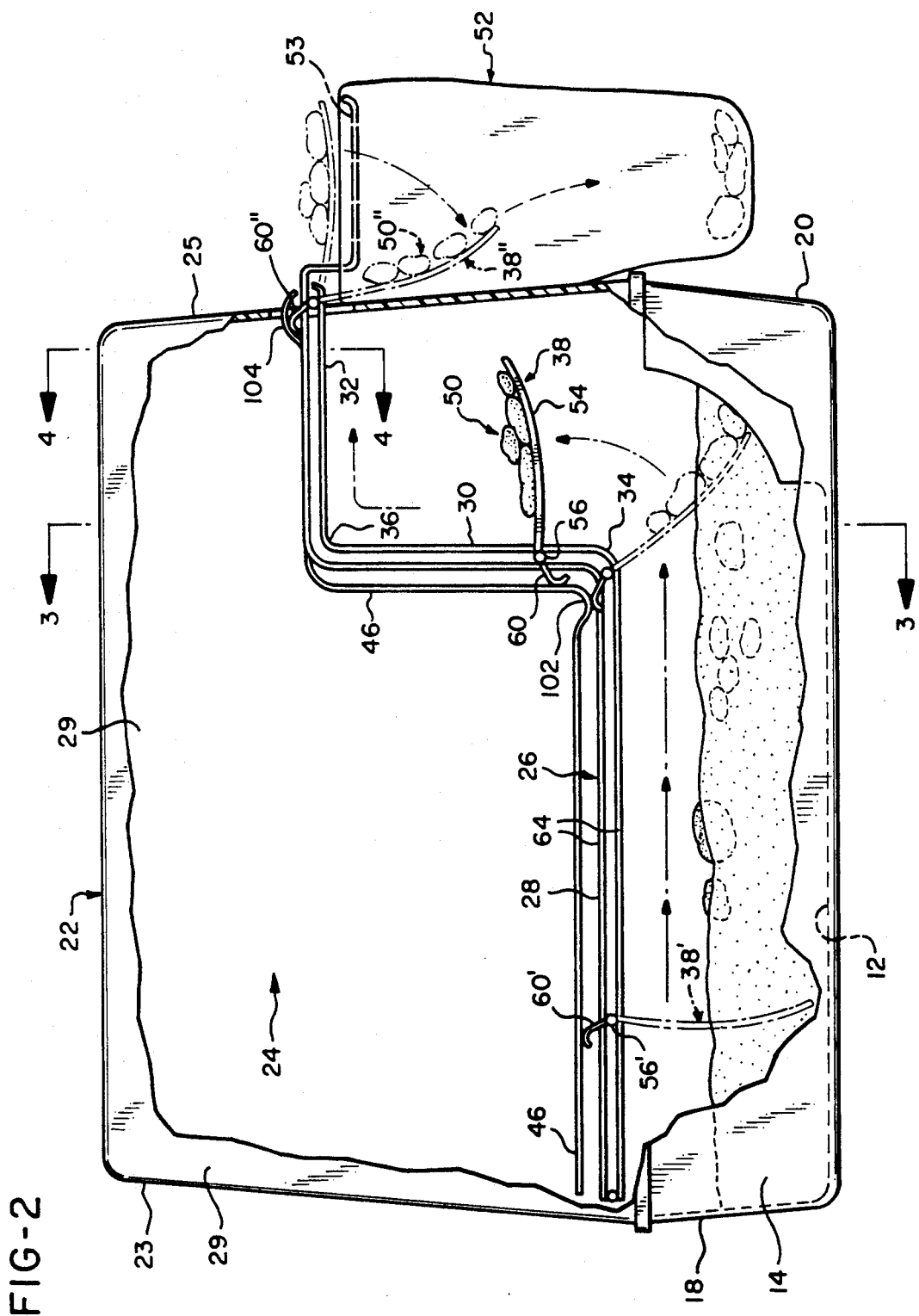
FIG. 2 is a side elevational view, partially broken away, illustrating the automated cat litter box cleaning system of the invention.

As best illustrated in FIG. 2, the lower longitudinally extending track sections 28 extend from one of the litter box end walls, namely a first or forward end wall 18. The lower track sections 28 are secured to the inside of the hood 22 at a lower level immediately above the litter box side walls 14 and 16. The lower track sections 28 extend rearwardly in a horizontal linear fashion to a junction region 34 where the tracks curve at the transition between the lower, linear track sections 28 and the vertical upright track sections 30. The upright track sections 30 extend linearly and vertically upwardly to meet the upper longitudinal track sections 32 at a curved transition region 36. The upright track sections 30 are located proximate to the second or rear end wall 20. The upper longitudinal track sections 32 extend from the upright track sections 30 at the curved transition region 36 rearwardly to roughly the plane of the other end wall 20.

The automated cat litter disposal system 24 also includes a litter scoop 38 that extends across the width of the litter box 10 between the side walls 14 and 16. The litter scoop 38 is constrained to move longitudinally along the tracks 26 and 27. The automated cat litter disposal system 24 also includes an electrically powered driving means, including a reversible electric motor indicated in phantom at 40 in FIG. 3, and advancement means in the form of cables 42 and 44. The electric motor 40 is secured by screws to an interior end wall of the hood 22. The operation of the electric motor is controlled by electronic components mounted on a printed circuit board 100 which is also attached to the inside of the hood 22. Together the electric motor 40 and the cables 42 and 44 move the scoop 38 along the tracks 26 and 27 between the opposite end walls 18 and 20.

The automated cat litter disposal system 24 also includes a means for guiding the orientation of the litter scoop 38 in the form of a pair of drag guide rods 46 and 48. The drag guide rods 46 and 48 are formed of stainless steel and are secured to the inside walls of the hood 22. They serve to hold the litter scoop 38 in a disposition to scrape the floor 12 as the scoop 38 moves from the first end wall 18 along the lower track sections 28, as indicated at 38' in FIG. 2. The drag guide rods 46 and 48 cause the scoop 38 to rotate through an arc as it moves through the transition region 34. The drag guide rods 46 and 48 hold the litter scoop 38 in a generally horizontal disposition to lift scrapings 50 from the floor 12 as the litter scoop 38 moves along the upright track sections 30 from the lower track sections 28 until it reaches the upper track sections 32, as indicated in solid lines in FIG. 2.

The drag guide rods 46 and 48 also hold the litter scoop 38 in a generally horizontal disposition as it moves along the upper sections 32. The drag guide rods 46 and 48 then allow the scoop 38 to counter-rotate to discharge the scrapings 50 over the rear or second end wall 20 and outside of the litter box 10 as the litter scoop 38 terminates its movement along the upright track sections 30 near the end wall 20, as depicted in phantom at 38" in FIG. 2. A receptacle in the form of a trash bag 52 is located at the second end wall 20 beneath the upper track sections 32 to receive the scrapings 50 discharged from the litter scoop 38, as depicted in phantom at FIG. 50" in FIG. 2. The trash bag 52 is held open by wire hangers 53, which are secured to the hood 22 at the rear opening 21 therein. The hangers 53 project rearwardly from the rear opening 21.

As best illustrated in FIG. 3, the litter scoop 38 is configured with a grate 54, a pair of track followers 56 and 58 extending laterally outwardly at the upper extremity of the grate 54, and lever arm means in the form of a tilt flange 60. The grate 54 extends across the width of the cat litter box 10 between the side walls 14 and 16. The grate 54 has a generally trapezoidal configuration, as illustrated in FIG. 3, and has a width of ten and one-half inches across its bottom rail, so that it contacts the floor 12 across the entire floor width while residing in the area of the lower track sections 28. The tilt flange 60 extends from the track followers 56 and 58 in an opposite direction from the grate 54, as best illustrated in FIGS. 1 and 2.

The scoop drag guide rods 46 and 48 follow the course of the track sections 28, 30 and 32 in lateral alignment with the tilt flange 60 which serves as a lever arm. The drive motor 40 and the cables 42 and 44 cause the tilt flange 60 to ride in contact and bear against the drag guide rods 46 and 48 as the cables 42 and 44 move the litter scoop 38 from the end wall 18 toward the other end wall 20, as illustrated in FIG. 2.

Figure 5:
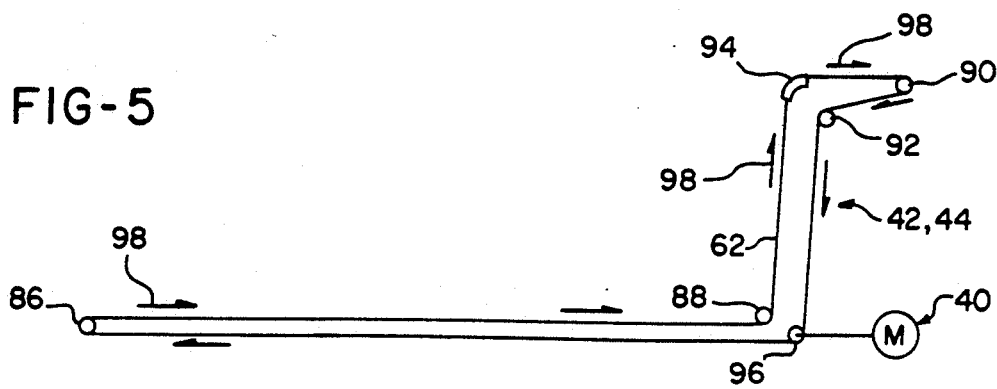
FIG. 5 is a diagrammatic illustration of the scoop propulsion system of the embodiment of the invention depicted.

Each of the cables 42 and 44 is secured to a separate one of the track followers on an opposite side of the litter box 10. That is, the cable 42 is secured to the track follower 56 while the cable 44 is secured to the track follower 58. Each of the cables 42 and 44 is mounted to form an endless loop 62, as illustrated in FIG. 5. The loops 62 formed by the cables 42 and 44 follow the course of the rigid tracks 26 and 27.

As illustrated in FIG. 2, the drag guide rods 46 and 48 are both spaced from the tracks 26 and 27, respectively by a greater distance of separation at the lower track sections 28 than from the portions of the upper track sections 32 that are located proximate to the upright track sections 30. This ensures that the grate 54 is held in a generally upright disposition as it moves across the floor 12, and is rotated into a generally horizontal disposition as the scoop 38 moves along the upright track sections 30 and the upper track sections 32 until the scoop 38 approaches the plane of the end wall 20.

Figure 6:
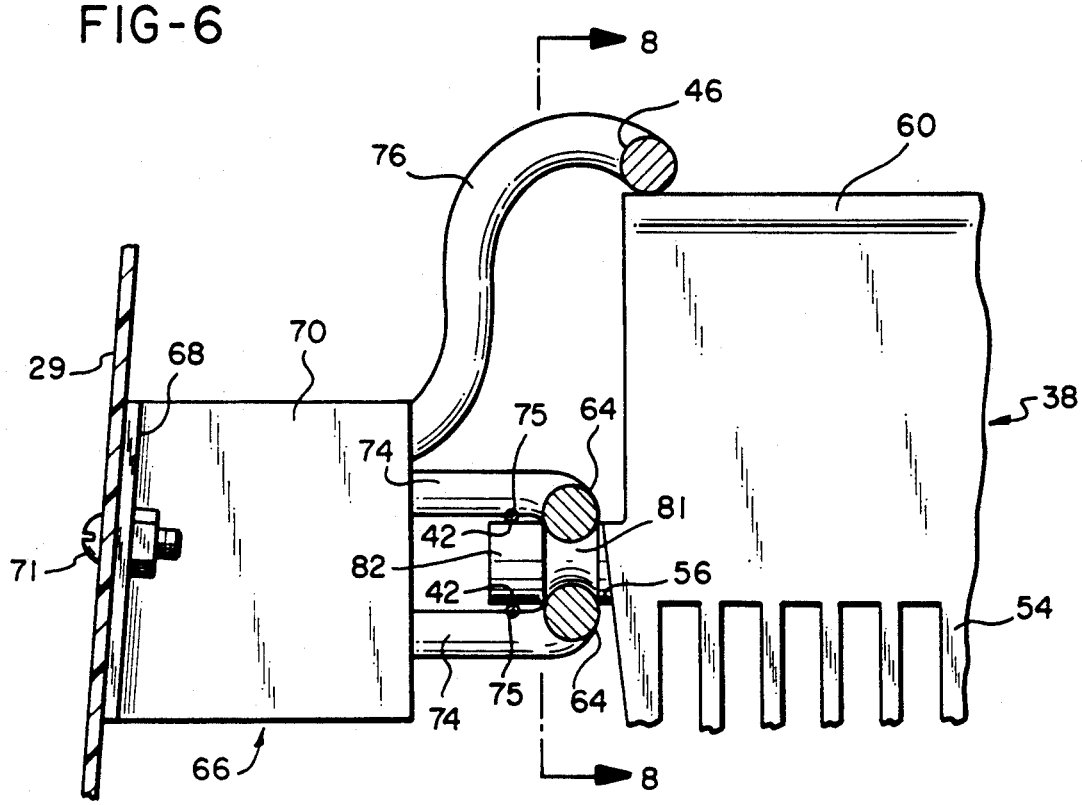
FIG. 6 is a sectional elevational detail showing the manner of mounting the lower section of the track and the scoop guide.

FIG. 6 illustrates the manner in which the lower track sections 28 are secured to the hood 22 above the upright side walls 14 and 16. The lower track sections 28 are each formed by longitudinally extending, horizontal sections of a pair of stainless steel rods 64, spaced one above another as illustrated in FIG. 6. The horizontally extending sections of the track rods 64 are held mutually parallel to each other by means of mounting bracket assemblies 66 which are spaced periodically along the longitudinal length of the lower track sections 28.

Each mounting bracket assembly 66 is formed by a mounting angle shaped as a dihedral having angle plates 68 and 70. Each angle plate 68 is bolted flush against an interior surface of the side walls 29 of the hood 22. The angle plates 70 extend inwardly into the interior enclosure within the hood 22 in planes perpendicular to the side walls 29 of the hood 22. A pair of mounting rod segments 74 are welded to the angle plate 70 and extend inwardly toward the litter scoop 38. The inner extremities of the mounting rod segments 74 are welded to the longitudinally extending rods 64 where they define the lower track sections 28. Grooves 75 are defined in the mutually facing surfaces of the rod segments 74 to allow passage of the cables 42 and 44.

Other mounting rod segments 76 are welded to the angle plates 70 and also to the longitudinally extending drag guide rods 46 and 48. The mounting rod segments 74 and 76 are quite rigid, so that the gap between the longitudinally extending rods 64 is uniform throughout the lengths of the rods 64, and so that the track rods 64 are spaced a predetermined distance from the drag guide rods 46 and 48. This distance varies in a predetermined manner along the lengths of the tracks 26 and 27.

Mounting bracket assemblies 66 of the type depicted in FIG. 6 are also employed to hold the lower extremities of the upright track sections 30 at a distance spaced inwardly from the interior surfaces of the upright side walls 29 of the hood 22. The upright track sections 30 extend vertically upwardly parallel to each other and are held at their upper extremities by mounting assemblies 76 of the type depicted in FIG. 4.

Each mounting assembly 76 is formed of a base plate 78 which is secured by screws 71 to the interior surface of the upper region of the hood side walls 29. A pair of connecting rod segments 80 extend inwardly from the base plate 78 of each mounting bracket assembly 76 and are welded to the longitudinally extending track rods 64. The rod sections 80 hold the track rods 64 apart to define a gap therebetween which is identical to the gap between the longitudinally extending rods 64 as defined by the connecting rod sections 74 of the mounting bracket assemblies 66. On the underside of each uppermost rod section 80 there is secured a guide sleeve 94 of the type hereafter to be described.

Figure 4:
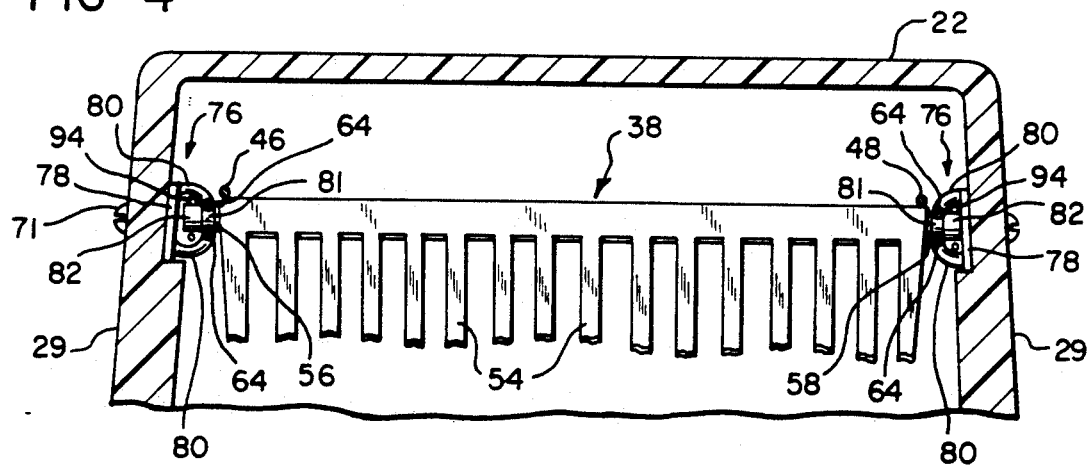
FIG. 4 is a sectional elevational detail taken along the lines 4—4 of FIG. 2.

Another connecting rod section 82 is welded to each base plate 78 and extends inwardly from the interior wall surface of each hood side wall 29. The inner extremities of the mounting rod sections 82 are welded to the longitudinally extending drag guide rods 46 and 48 as illustrated in FIG. 4.

Figure 7:
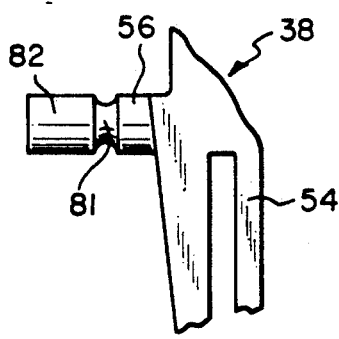
FIG. 7 is an elevational detail of one of the track followers of the system.
Figure 8:
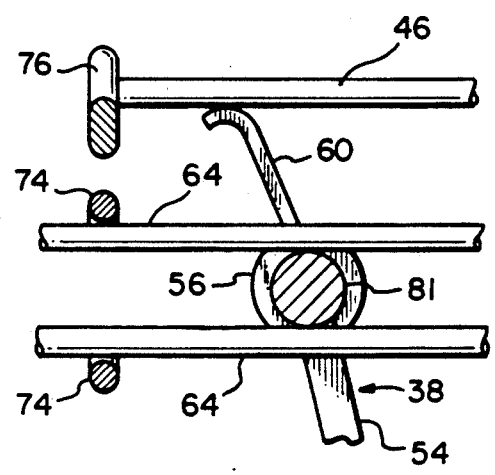
FIG. 8 is a sectional elevational detail taken along the lines 8—8 of FIG. 6.

FIG. 7 illustrates one of the track followers 56 in isolation. Each track follower 56 is formed as a cylindrical stub axle extending outwardly from the upper extremity of the grate 54 to which it is attached. The track followers 56 and 58 are both formed with annular grooves of semicircular cross section which define necked down sections 81. The thickness of the necked down sections 81 is only slightly less than the width of the gap separating the longitudinally extending track rods 64, so that the necked down sections 81 ride longitudinally between the track rods 64, as best illustrated in FIGS. 4, 6, and 8. The track followers 56 and 58 are thereby captured by the track rods 64 and are constrained to move longitudinally therebetween. Also, the track followers 56 can move in rotation relative to the tracks 26 and 27.

Laterally outwardly from the necked down sections 81 in the track followers 56 and 58 each of the cables 42 and 44 is fastened to a single, specific location at the top of a projecting ear 82 of an associated one of the track followers. That is, the cable 42 is fastened to the top of the projecting ear 82 of the track follower 56, while the cable 44 is secured atop the ear 82 of the track follower 58. The cables 42 and 44 are secured to their respective ears 82 by pins (not shown). The cables 42 and 44, when driven, are thereby able to pull the track followers 56 and 58 along their respective tracks 64 by the connection provided at the ears 82.

Each of the cables 42 and 44 is formed into an endless loop 62, and the track followers 56 and 58 are longitudinally immobilized relative to specific, fixed locations on the endless loops 62 by the pins 85. The configuration of each of the loops 62 is controlled by the placement of four different pulleys, indicated at 86–92, by a curved cable guide sleeve 94, and by a motor drive drum 96, as illustrated diagrammatically in FIG. 5. The movement of the track follower 56 and 58 is confined to the region between the end walls 18 and 20. Consequently, the track followers 56 and 58 never pass the pulleys 86, 90, and 92. The track followers 56 and 58 do pass the pulley 88, but the tension on the cables 42 and 48 is such as to pull the cables radially inwardly toward the axes of the pulleys 88. At the top of the upright track sections 30, on the other hand, pulleys cannot be employed since the tension on the endless loops 62 and 64 is downward to the rear and forward to the front. As a consequence, cable guides 94 must be employed in place of pulleys. The cable guides 94 are formed as longitudinally curved guide sleeves having longitudinal slot-like openings in their undersides to allow the passage of the projecting ears 82 therebeneath. The cross section of the slotted guide sleeves 94 provides a constraint that extends over an arc greater than 180 degrees. Therefore, the cables 42 and 44 are held captured within the guide sleeves 94, but can travel longitudinally therethrough.

The motor drive drum 96 is formed as an elongated spool driven by the motor 40. The motor drum 96 has a rubber outer surface so as to enhance traction with the cables 42 and 44. Cables 42 and 44 are each spirally wound with several wraps at each of the opposite ends of the drum 96, so that as the drum 96 turns, the cables 42 and 44 are longitudinally advanced in the direction in which the drum 96 rotates due to frictional engagement between the cables 42 and 44 and the elongated drum 96.

The electric motor 40 is a reversible electric motor. The motor 40 is driven to rotate the drum 96 in a clockwise direction, as viewed in FIG. 5, the cables 42 and 44 are advanced longitudinally as indicated by the directional arrows 90. This advancement pulls the cable followers 56 from a location proximate the pulleys 86 near the end wall 18 longitudinally to the right as viewed in FIG. 5. As the track followers 56 and 58 approach the transition 34 between the lower track sections 28 and the upright track sections 30, the upper portion of the cables 42 and 44 which is attached to the tops of the ears 82, passes in horizontal advancement away from the end wall 18 and moves in an arc past the pulley 88. The cables and track followers 56 and 58 thereupon move vertically upwardly until they reach the guide sleeves 94.

At the guide sleeves 94 the track followers 56 and 58 and the cables 42 and 44 change direction of movement from vertical upward movement to horizontal forward movement, with the cables 42 and 44 passing through the guide sleeves 94, and with the ears 82 passing therebeneath. The cables 42 and 44 then carry the track followers 56 and 58 horizontally forward and the cables 42 and 44 move in the direction of the directional arrows 98 until the track followers 56 and 58 approach the pulley 90. The motor 40 is stopped to halt advancement of the track followers 56 and 58 before they reach the pulley 90.

It is at this point that the litter scoop 38 discharges the soiled cat litter material into the trash bag 52. A printed circuit board 100 is programmed to control the motor 40 to stop advancement of the cables 42 and 44 just before the track followers 56 and 58 reach the pulley 90, and to hold the cables 42 and 44 immobile for a time interval sufficient to allow soiled cat litter material 50" to fall clear of the scoop 38 and into the trash bag 52. Upon the lapse of this time interval the printed circuit board 100 controls the motor 40 to reverse the direction of motor rotation and to longitudinally advance the cables 42 and 44 in the counterclockwise direction opposite the directional arrows 98 depicted in FIG. 5 until the track followers 56 and 58 approach the pulley 86. The system can be programmed either to repeat another complete cycle of operation so as to carry the scoop 38 through a second pass across the floor 12 of the cat litter box 10, or to terminate operation of the automated cat litter disposal system until it is actuated at a subsequent time.

A complete cycle of operation of the automated cat litter disposal system of the invention proceeds as follows. An actuating control, such as a push button is depressed to provide a signal to the printed circuit board 100. This initiates a programmed sequence of operation using conventional electronic components mounted on the printed circuit board 100.

Actuation of the system commences operation of the motor 40 to rotate the drum 96 and advance the cables 42 and 44 in the direction indicated by the directional arrows 98 in FIG. 5. At the start of each cycle the scoop 38 is located near the end wall 18. The grate 54 projects downwardly from the track followers 56 and 58 and into contact with the floor 12 of the cat litter box 10. The grate 54 resides at a slight angle from perpendicular alignment relative to the floor 12, sloping slightly upwardly and rearwardly as depicted in FIG. 2. The tilt flange 60 extends upwardly and rearwardly from the track followers 56 and 58 and extends into contact with the drag guide rods 46 and 48.

As the motor 40 operates to draw the cables 42 and 44 in the directions indicated by the directional arrows 98 in FIG. 5, the scoop 38 is pulled forwardly away from the end wall 18 and toward the opposite end wall 20. The resistance of the soiled cat litter material on the floor 12 tends to exert a clockwise force on the scoop 38, as viewed in FIG. 2. However, the tilt flange 60 is constrained by the countervailing counterclockwise force exerted by the drag guide rods 46 and 48 so that the scoop 38 moves only in translation, and not rotation, as it advances from a position near the end wall 18 toward the pulley 88. The track followers 56 and 58 are constrained to move longitudinally between the tracks 64.

As illustrated in FIG. 2, the scoop drag guide rods 46 and 48 are curved toward the tracks 64 as indicated at 102 in the transition region 34 at locations proximate to the pulleys 88. Therefore, as the portions of the cables 42 and 44 which are fastened to the ears 82 pass around the pulleys 88, the reduced distance of separation of the curved sections 102 of the drag guide rods 46 and 48 from the track rods 64 causes the scoop 38 to rotate in a counterclockwise direction as the scoop 38 travels from the end of the lower track sections 28 nearest the opposite end wall 20 into the upright sections 30. This counterclockwise rotation of the scoop 38 causes the scoop 38 to assume a generally horizontal disposition as the track followers 56 and 58 are pulled vertically upwardly along the upright track sections 30 between the tracks 64. Therefore, as the scoop 38 moves in translation vertically upwardly in a generally horizontal disposition, it carries the soiled cat litter material 50 upwardly with it.

At the curved transition region 36 between the upright sections 30 of the tracks 26 and 27 and the upper sections 32 thereof, the distance of separation between the drag guide rods 46 and 48 from the tracks 64 is significantly reduced. Thus, even though the translational movement of the scoop 38 changes from vertical upward motion along the upright track sections 38 to horizontally forward motion along the upper track sections 32, the close proximity of the drag guide rods 46 and 48 to the tracks 64 in the upper track sections 32 causes the lever arm 60 to hold the grate 54 in a generally horizontal disposition. This occurs because the lever arm 60 is itself held in a nearly horizontal disposition by the track guide rods 46 and 48 in the region of the upper track sections 32 proximate the transition region 36 between the upright track sections 30 and the upper track sections 32.

The scoop 38 is held generally in a horizontal disposition as the track followers 56 and 58 are drawn toward vertical alignment with the end wall 20 of the cat litter box 10. However, near the forward end of the upper track section 32 the track guide rods 46 are curved outwardly at 104 away from the track rods 64. The drag guide rods 46 and 48 are thereby spaced from the tracks 26 and 27 by a greater distance of separation at the lower track sections 28 than at the portions of the upper track sections 32 located proximate to the upright track sections 30.

As the scoop 38 reaches the opening 21 in the cat litter box hood 22 the lever arm 60 of the scoop 38 reaches the upwardly curved sections 104 of the drag guide rods 46 and 48, the weight of the soiled cat litter material 50 on the grate 54 and the weight of the grate 54 itself, causes the scoop 38 to rotate clockwise to the extent permitted by the separation between the section 104 of the track guide rods 46 and 48 and the tracks 64. That is, the scoop 38 will rotate clockwise to the extent permitted by the interaction between the lever arm 60 and section 104 of the drag guide rods 46 and 48.

Once the scoop 38 has reached the position indicated at 38' in FIG. 2, the electronic program stored in the chips on the electronic printed circuit board 100 will suspend operation of the motor 40 to allow sufficient time for the soiled cat litter material indicated at 50" in FIG. 2 to clear the lower extremity of the grate 54. The operation of the motor 40 is then reversed, whereupon the scoop 38 is pulled rearwardly along the upper track sections 32 of the tracks 26 and 27 toward the upright sections 30 thereof.

As the scoop 38 is pulled away from vertical alignment with the end wall 20, the interaction between the lever arm 60 and the drag guide rods 46 and 48 causes the scoop 38 to counter-rotate in a counterclockwise direction, as viewed in FIG. 2, and again assume a generally horizontal disposition. The scoop 38 will remain in this generally horizontal position through the transition 36 from the upper track sections 32 to the upright track sections 30. Once the scoop 38 clears the sections 102 of the drag guide rods 46 and 48 at the transition 34 between the upright track sections 30 and lower track sections 26, the scoop 38 will rotate back down to the orientation depicted at 38' in FIG. 2. Once the scoop 38 returns to its original, initial position proximate to the end wall 18, the cycle is complete.

In some instances it is desirable for the circuit elements of the printed circuit board 100 to be programmed to operate the scoop 38 through a plurality of cycles each time the device is actuated in order to fully scrape the residue from the floor 12 of the cat litter box 10. In other instances a single cycle of operation will suffice.

Undoubtedly, numerous variations and modifications of the invention will become readily apparent to those familiar with cat litter boxes. Accordingly, the scope of the invention should not be construed as limited to the specific embodiment depicted and described, but rather as defined in the claims appended hereto.

I claim:

1. An automated cat litter disposal system for a cat litter box having a floor, a pair of side walls and a pair of opposite end walls comprising:

a set of parallel tracks extending along said side walls including lower sections extending longitudinally along said side walls from a first one of said end walls, upright sections rising from said lower sections in proximity to the other of said end walls, and upper sections extending between said upright sections and said other end wall, a rigid scoop extending laterally between said tracks and mounted for longitudinal movement therealong, scoop propulsion means for driving said scoop along said tracks between said opposite end walls of said litter box, scoop guide means for holding said scoop in an orientation to scrape said litter box floor as it moves between said first one of said end walls and said upright sections of said tracks, in an orientation to lift scrapings upwardly from said floor as it moves along said upright sections of said tracks, and in an orientation to discharge said scrapings over said other end wall as it reaches said other end wall, and a discharge receptacle located outside of said litter box at said other end wall thereof to receive said scrapings from said scoop.

2. An automated cat litter disposal system according to claim 1 wherein said scoop is comprised of a pair of track followers which engage said tracks, a grate which depends from said track followers and which extends the width of said litter box between said side walls, and lever means extending from said track followers in a direction opposite said grate, and said scoop guide means is comprised of drag guide means which extends along said side walls and which engages said lever means to cause rotation of said scoop about said track followers as it moves along said track means to thereby control orientation of said scoop as aforesaid.

3. An automated cat litter disposal system according to claim 2 wherein said drag guide means is comprised of a pair of longitudinally extending scoop guide rails which follow the course of said pair of parallel tracks between said end walls and which vary in spacing from said tracks so as to control orientation of said scoop as aforesaid.

4. An automated cat litter disposal system according to claim 3 wherein said scoop propulsion means is comprised of a pair of cables which form endless loops that are mounted to follow the course of said track sections, connecting means which couples said track followers to specific locations on said cables, and means for driving said cables to advance said loops alternatively in opposite directions.

5. An automated cat litter disposal system according to claim 4 wherein said means for driving said cables includes a reversible electric motor.

6. An automated cat litter box cleaning system for cleaning a cat litter box having a pair of side walls, opposite end walls and a floor comprising:

a set of rigid tracks mounted parallel to each other at said side walls along the lengths thereof and including upper and lower longitudinally extending sections and an intermediate upright section whereby said lower longitudinally extending track sections extend from one of said end walls, said upper longitudinal track sections extend from the other of said end walls, and said upright track sections join said upper and lower track sections proximate to said other of said end walls, a litter scoop that extends across the width of said litter box between said side walls and is constrained to move longitudinally along said tracks, electrically powered driving means for moving said scoop along said tracks between said opposite end walls, means for guiding the orientation of said litter scoop to hold it in a disposition to scrape said floor as it moves from said one of said end walls along said lower track sections, in a disposition to lift scrapings from said floor as it moves along said upright track sections from said lower to said upper track sections, and in a disposition to discharge said scrapings over said other end wall and outside of said litter box as it terminates movement from said upright track sections toward said other end wall along said upper track sections, and receptacle means located at said other end wall and beneath said upper track sections to receive said scrapings discharged from said litter scoop.

7. An automated cat litter disposal system according to claim 6 wherein said litter scoop is configured with a grate, a pair of track followers extending laterally outwardly at the upper extremity of said grate, and level arm means extending from said track followers in an opposite direction from said grate, and said means for guiding the orientation of said scoop is comprised of a drag guide means which follows the course of said track sections in lateral alignment with said lever arm means, and said driving means includes advancement means which causes said lever arm means to ride in contact and bear against said drag guide means as said driving means moves said scoop from said one of said end walls toward said other end wall.

8. An automated cat litter disposal system according to claim 7 wherein said driving means is further comprised of a reversible electric motor coupled to operate said advancement means.

9. An automated cat litter disposal system according to claim 8 wherein said advancement means is comprised of a pair of cables each of which is secured to a separate one of said track followers and is mounted to form an endless loop that follows the course of said rigid tracks.

10. An automated cat litter disposal system according to claim 9 wherein said drag guide means is spaced from said tracks by a greater distance of separation at said lower track sections than from the portions of said upper track sections located proximate to said upright track sections.

11. In a cat litter box having a floor, a pair of side walls and a pair of opposite end walls comprising an automated cat litter disposal system including stationary sets of parallel tracks arranged with lower sections extending longitudinally at a lower level along said side walls from a first of said end walls, upright sections located proximate to a second of said end walls and rising from said lower sections, and upper sections extending from said upright sections to said second end wall, a scoop mounted to move along said tracks and extending between said side walls and having a length that extends between said lower sections of said tracks to said floor and having a forwardly facing scooping surface, automated scoop propulsion means for automatically driving said scoop along said tracks from a position proximate said first end wall to said second end wall, scoop orientation guide means arranged to hold said scoop directed downwardly into contact with said floor from said lower sections of said tracks, forwardly from said upright sections toward said second end wall, and downwardly as said scoop reaches said second end wall, and a soiled litter collection container located at said second end wall to receive soiled litter discharged from said scooping surface of said scoop.

12. An automated cat litter disposal system according to claim 11 wherein said scoop is comprised of track followers engaged with said tracks, and lever means for rotating said scoop about said track followers and relative to said tracks, and said scoop orientation guide means is comprised of rail means that follow said tracks at distances therefrom that vary over the course of said tracks, whereby said propulsion means causes said lever means to bear against said rail means as said propulsion means drives said scoop along said tracks.

13. An automated cat litter disposal system according to claim 12 wherein said propulsion means is comprised of a reversible electric motor and endless cable loop means connected to said track followers, whereby said electric motor selectively drives said endless cable loop means alternatively in opposite directions of advancement.

* * * * *